Patented Sept. 30, 1930

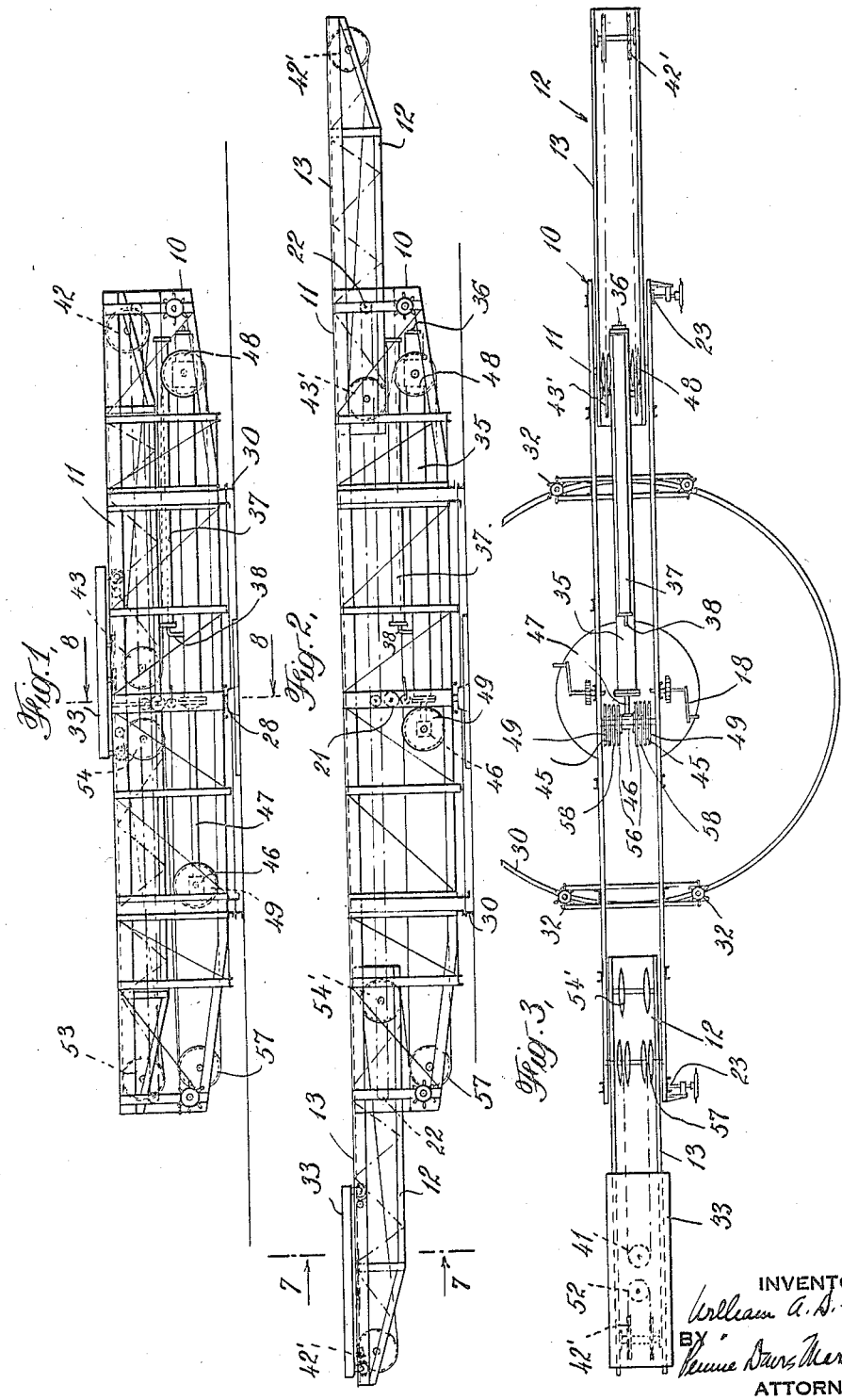

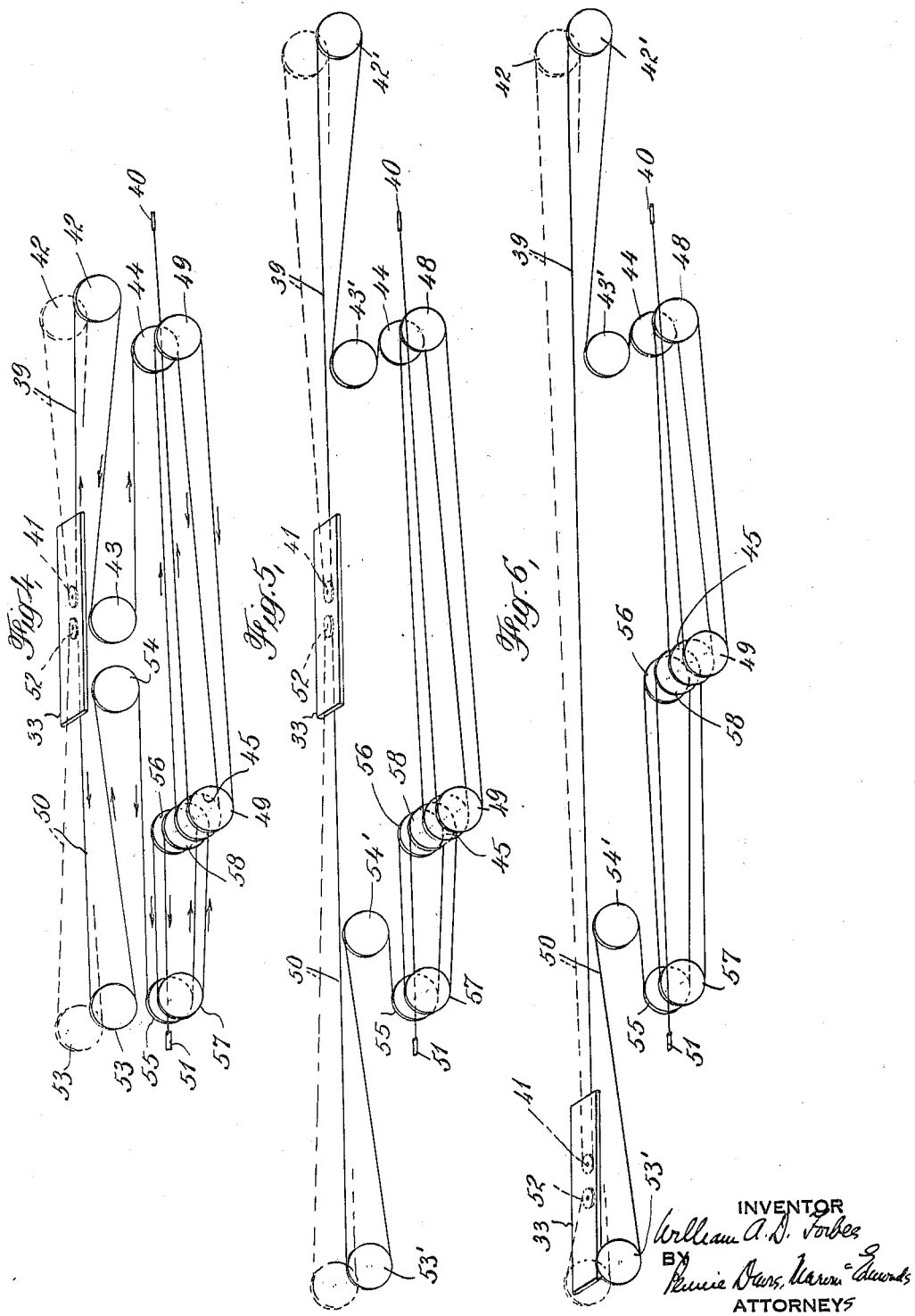

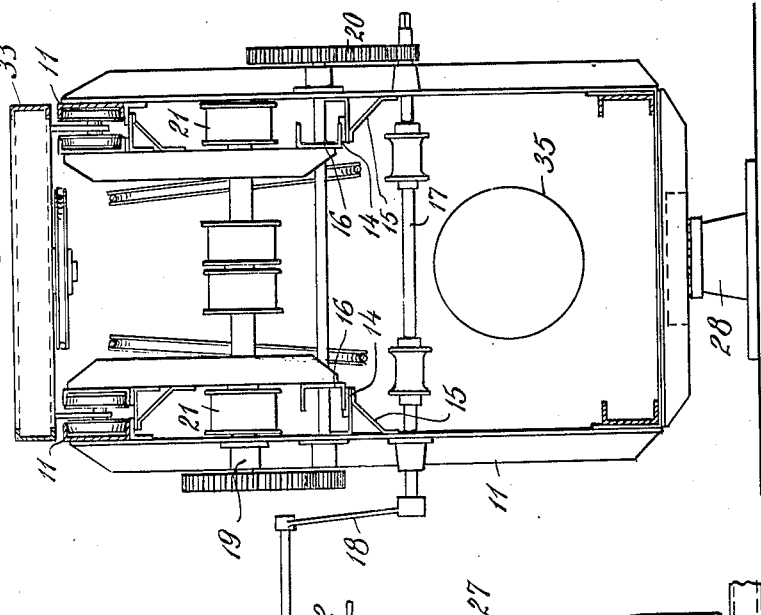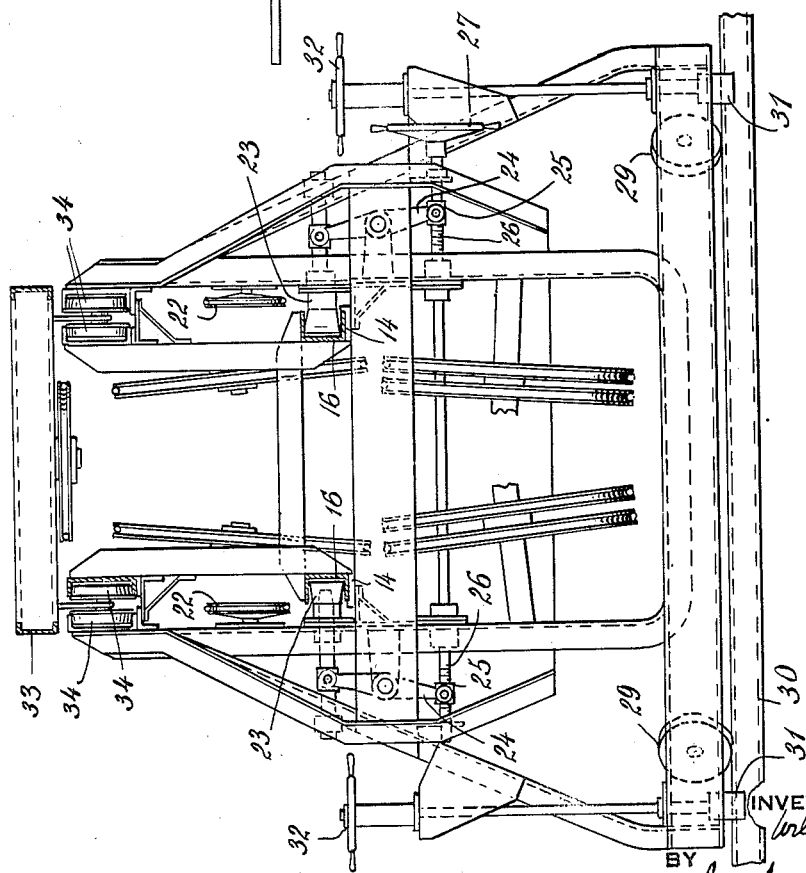

1,777,167

UNITED STATES PATENT OFFICE

WILLIAM ARCHIBALD DAVIDSON FORBES, OF COULSDON, ENGLAND

APPARATUS FOR LAUNCHING AIRCRAFT

Application filed October 9, 1929, Serial No. 398,375, and in Great Britain November 9, 1928.

This invention relates to mechanism of the catapult type for launching aircraft from ships, the tops of buildings, and similar places where the aircraft cannot obtain the necessary run to permit it to reach flying speed under its own power. More particularly the invention is concerned with a launching mechanism in which a prime mover in the form of a cylinder and piston combination is employed, and power is transmitted to the trolley for the airplane through a rope drive.

The object of the invention is to provide a launching mechanism of improved construction whereby the length of run of the trolley is substantially greater than the overall stowage length of the apparatus, so that the device when not in use occupies little space. When the mechanism is adjusted and in condition for operation, the longer run provided makes it possible to obtain a higher launching speed for a given maximum acceleration, or alternatively, permits a lower acceleration to be used for a given launching speed than would be the case if the length of run were limited to the stowage length of the apparatus. These results are obtained with less expenditure of power than in devices as heretofore constructed, and similarly less energy is absorbed on retardation of the moving parts.

In the novel catapult, there is a main track structure preferably of girder construction, and this structure is provided with track extensions at one or both ends. These extensions are so constructed that they may be freely moved to stowed or exposed position independently of the launching mechanism when the trolley is in stowed position. Preferably the extensions can be housed entirely within the main structure and thus add nothing to its overall stowed dimensions. When the catapult is to be put into use, the extensions are run out to proper position and locked in place, so that the trolley may be propelled through a run equal to the length of the main structure plus the length of the extensions.

The prime mover of the apparatus is connected to the trolley by a rope reeved around sets of sheaves in part on the main structure and in part on the extensions, and this drive is so constructed that the position of the extensions in no way affects the operation of the drive. Accordingly, the extensions and the trolley may be moved independently and without effect upon one another. In this catapult, therefore, the increase in the run of the trolley is provided without requiring the prime mover to accelerate or retard any masses other than the aircraft, the trolley, and the parts making up the rope drive.

For a better understanding of the invention, reference may be had to the accompanying drawing, in which Fig. 1 is a view of the apparatus in side elevation, the extensions being housed;

Fig. 2 is a similar view with the runway fully extended and the trolley in launching position;

Fig. 3 is a plan view of the apparatus in the condition illustrated in Fig. 2;

Fig. 4 is a diagrammatic view showing the condition of the rope drive when the extensions and trolley are in stowed position;

Fig. 5 is a similar view with the extensions in their outer positions;

Fig. 6 is a view similar to Fig. 5 but showing the trolley in launching position;

Fig. 7 is a sectional view on the line 7—7 of Fig. 2, and

Fig. 8 is a sectional view on the line 8—8 of Fig. 1.

Referring now to the drawings, the catapult is illustrated as made up of a main track structure 10 of girder construction, this structure carrying a runway 11 along its top. The structure 10 is provided at one or both ends with extending portions 12 having runways 13, these extensions being arranged for housing within the main structure. For this purpose, the main structure is provided with rails 14 mounted on brackets 15 on the inner faces of the uprights of the structure and the extensions are provided with rails 16 in which may be mounted rollers running on rails 14. The extensions are of such construction that their inner ends overlap the ends of the main structure when the extensions are in their outer position so that the forces exerted on the extensions in the operation of the apparatus are transmitted to the main structure.

The extensions may be moved out and in separately or together by any suitable power driven mechanism or by hand. As illustrated, a shaft 17 mounted in suitable bearings in the main structure and provided with a hand crank 18 drives another shaft 19, through multiplying gearing 20. On the shaft 19 are winches or drums 21 and sheaves 22. Ropes attached to the extensions are reeved through sheaves 22 and taken up on the winches 21 to move the extensions in and out. This arrangement may be replaced if desired by a motor driving pinions on shafts on the main structure engaging racks attached to the extensions. As another expedient, the prime mover of the launching mechanism may be employed as the source of power. For this purpose, the trolley is secured to one of the extensions so that movement of the trolley by the prime mover is transmitted through the trolley to the extension. By a suitable rope drive, this movement may be transmitted to the other extension so that the two may move in and out in unison.

When the extensions are in outer position, they are locked in place by locking bolts 23 actuated by levers 24 pivotally mounted on the main structure. These levers are swung by nuts 25 on a threaded shaft 26 which may be operated by a hand wheel 27 or by a motor.

The main structure is mounted on a pivot 28 and is provided with rollers 29 (Fig. 7) running on a circular track 30. The catapult can thus be turned so as to be trained into the wind and the movement of the catapult is accomplished by any suitable hand or power-operated mechanism. The structure is provided with clamps 31 which can be raised to engage the under-surface of the rail of the track 30 to lock the catapult in the desired position. The clamps 31 are operated by a hand wheel 32.

The trolley 33 is provided with duplicate sets of wheels 34, and one set travels in the runways on the main structure while the other travels in the runways on the extensions. The track members of which the runways are formed have overhanging portions, as illustrated in Fig. 7, to prevent the trolley from being dislodged from the runway, and the trolley may be provided with supports to prevent the aircraft from lifting clear of the trolley and to enable the aircraft to leave the trolley when the latter is retarded. Standard mechanism may also be provided to prevent the aircraft from leaving the trolley until the latter has reached a predetermined point on the runway. It is customary in devices of this sort also to provide suitable mechanism to anchor the trolley and prevent any movement thereof caused by the thrust resulting from running the engine of the airplane, and such mechanism is frequently arranged to release the trolley when the latter is subjected to a predetermined thrust. Such mechanism may be employed on the trolley of this invention, or may be secured to the crosshead of the cylinder and piston combination.

The prime mover for the trolley takes the form of a cylinder and piston combination 35 and the piston may be operated by compressed air, hydraulic power, or by gas pressure resulting from firing a charge of propellent such as cordite. When compressed air is employed, the air reservoir may be mounted on the main girder structure, or the air may be delivered to the cylinder through a pipe leading from the central pivot to the front end 36 of the cylinder. When gas pressure is employed, an expansion chamber and breech block are fitted to the front end of the cylinder in the usual manner. The piston and cylinder may also be employed for retarding the motion of the trolley and the other moving parts at the end of the accelerating stroke. Such means may take the form of a receiving cylinder 37 connected to the main cylinder through a pipe 38 of restricted cross-section. Fluid in the cylinder at the rear of the piston is forced out through the pipe 38 to the receiving chamber 37 and by restricting the rate of flow the piston may be subjected to a braking action near the end of its movement.

The motion of the piston is transmitted to the trolley by a multiplying rope drive. For this purpose an accelerating rope 39 is employed, the ends of the rope being attached to the main girder structure, as at 40. At its mid-point the rope is attached to the trolley. For example, it may be reeved around an equalizing sheave 41 or attached to the trolley by means of pivoted levers so arranged that in the event of one part of the rope breaking, the other part will assume the entire stress. As illustrated in Fig. 4, one part of the rope, starting with sheave 41, is led around a guide sheave 42 at the outer end of one of the extensions. The rope is then led back and around another sheave 43 at the opposite end of the extension. From this sheave the rope passes around a sheave 44 on the main girder structure and thence around a sheave 45 which is mounted on a cross-head 46 (Fig. 1) attached to the piston rod 47. The rope now passes around a fixed sheave 48 on the main girder structure adjacent the sheave 44 and is then led around another sheave 49 on the cross-head. From this sheave, the rope is led from its point of attachment to the main girder structure 40. The other half of the rope is led around similar sheaves to its point of attachment.

The retarding rope 50 is connected at its end to the main girder structure at points 51.

At its mid-point the rope passes around an equalizing sheave 52 on the trolley and is then led around a sheave 53 at one end of the other extension and then around another sheave 54 at the opposite end of this extension. From the sheave 54 the rope passes around a sheave 55 mounted on the main girder structure and thence around a sheave 56 on the cross-head. From this sheave the rope passes around a fixed sheave 57 on the main girder structure and thence around a second sheave 58 on the cross-head, from which the rope leads to its point of attachment. The other half of this rope is trained around similar sheaves on the other side of the carriage.

It will be observed that sheaves 42 and 43 are mounted in fixed relation at opposite ends of one of the extensions and when this extension is moved to its outer position the sheaves occupy the positions 42' and 43' in Fig. 5. Similarly, sheaves 53 and 54 are mounted in fixed relation on the other extension and when this extension is moved to its outer position, the sheaves assume the positions designated 53' and 54' (Fig. 5). When the extensions are in their outer positions, the length of rope between the equalizing pulleys, such as 41 and 42, is increased, while the length of the stretch of rope between sheaves 43 and 44, for example, is decreased by the same amount. Consequently the rope remains taut regardless of whether the extensions are stored, in their extreme outer position or at any point between the two.

When the trolley is in launching position, as illustrated in Fig. 6, for example, the pulleys 45, 49, 56 and 58 mounted on the cross-head are moved to the right (Fig. 6) by reason of the piston being at the extreme right hand end of the operating cylinder. When the piston is acted on by the propelling force, the cross-head moves to the left and this causes the stretches of rope between equalizing sheaves 41 and sheaves 42 to be shortened, causing a movement of the trolley from left to right (Fig. 6). In this movement the stretch of rope between sheave 52 and sheaves 53 is increased but the movement of the trolley toward the end of its run is retarded by the restriction of the flow of fluid out of the main cylinder into the receiving chamber.

The prime mover of the launching mechanism may be used to position the trolley at any desired position along the runways. For this purpose, air or hydraulic power may be employed. When air is used it is supplied at suitable pressure to the main cylinder or the receiving chamber, causing a movement of the piston which results in a movement of the trolley to the desired point on the runway. If desired, however, the movement of the trolley may be accomplished by means of a screw gear or the like, either hand or power-driven, acting on the cross-head 46.

What I claim:

1. Apparatus for launching aircraft which comprises a main structure provided with a runway, an extension movable with reference to the main structure, and in one position projecting beyond the end of the latter and in another lying substantially within the length of said structure, a runway on the extension, a trolley movable on said runways, a prime mover, and power-transmitting means connecting the prime mover and trolley and effective regardless of the position of said extension.

2. Apparatus for launching aircraft which comprises a main structure provided with a runway, an extension movable with reference to the main structure and in one position projecting beyond the end of the latter and in another lying substantially within the length of said structure, a runway on the extension, a trolley movable on said runways, a prime mover, and power-transmitting means connecting the prime mover and trolley and mounted in part on said main structure and in part on said extension, said means being effective regardless of the position of said extension.

3. Apparatus for launching aircraft which comprises a main structure provided with a runway, an extension movable with reference to the main structure and in one position projecting beyond the end of the latter and in another lying substantially within the length of said structure, a runway on the extension, a trolly movable on said runways, a prime mover, and power-transmitting means connecting the prime mover and trolley, the masses acted on by the prime mover remaining the same regardless of the position of said extension.

4. Apparatus for launching aircraft which comprises a main structure provided with a runway, an extension on said structure and movable from a position substantially within the length of the structure to a position in which it projects beyond the end of the latter, a runway on the extension, a trolley movable on said runways, a prime mover, and flexible power-transmitting means connecting the prime mover and trolley, said means being effective regardless of the position of said extension.

5. Apparatus for launching aircraft which comprises a main structure having a runway, an extension mounted on said structure and movable from a position in which it lies substantially within the length of said structure to a position in which it projects beyond the end thereof, a runway on the extension, a trolley movable on said runways, a prime mover on said structure, means for transmitting power from said prime mover to said trolley, and means for moving said extension from one position to the other.

6. Apparatus for launching aircraft which comprises a main structure having a runway, an extension mounted on said structure and movable from a position in which it lies substantially within the length of said structure to a position in which it projects beyond the end thereof, a runway on the extension, a trolley movable on said runways, a prime mover on said structure, and power-transmitting means including a flexible element connecting said prime mover and trolley and guide means for said element mounted in part on said main structure and in part on said extension.

7. Apparatus for launching aircraft which comprises a main structure having a runway, an extension mounted on said structure and movable from a position in which it lies substantially within the length of said structure to a position in which it projects beyond the end thereof, a runway on the extension, a trolley movable on said runways, a prime mover on said structure, and power-transmitting means including a rope connecting said prime mover and trolley and sheaves mounted on said main structure and extension around which said rope is led, said rope remaining taut regardless of the position of said extension relative to said main structure.

8. Apparatus for launching aircraft comprising a main structure having a runway, an extension on said structure movable from a position substantially within the length of said structure to a position in which it projects beyond the end thereof, a runway on said extension, a trolley movable on said runways, means for locking said trolley to said extension, and power means for moving said trolley, said means being also effective to move the extension when said trolley is locked thereto.

9. Apparatus for launching aircraft comprising a main structure having a runway, an extension on said structure movable between a stowed to an exposed position in which said extension projects beyond said structure, a runway on said extension, a cylinder and piston on said main structure, means for driving the piston, means for retarding the movement of the piston, and connections between the piston and trolley for accelerating and retarding the latter.

10. Apparatus for launching aircraft comprising a main structure having a runway, an extension on said structure movable between a stowed to an exposed position in which said extension projects beyond said structure, a runway on said extension, a cylinder and piston on said main structure, means for driving the piston, means for retarding the movement of the piston, flexible connections between the piston and trolley for accelerating and retarding the latter, and guide means for said connections, whereby the accelerating and retarding effects transmitted to said trolley are multiplied.

11. Apparatus for launching aircraft comprising a main structure having a runway, an extension on said structure movable between a stowed and an exposed position in which said extension projects beyond said structure, a runway on said extension, a cylinder and piston on said main structure, means for driving the piston, a cross-head connected to the piston to be moved thereby, and a rope drive for connecting the cross-head and trolley, said drive including sheaves on the cross-head and other sheaves on opposite ends of said extension, whereby said extension is freely movable without affecting the action of said drive.

12. Apparatus for launching aircraft comprising a main structure having a runway, an extension on said structure movable between a stowed and an exposed position in which said extension projects beyond said structure, a runway on said extension, a cylinder and piston on said main structure, means for driving the piston, a cross-head connected to the piston to be moved thereby, a rope connecting the cross-head and a trolley, sheaves for the rope at opposite ends of said extension, and a sheave for the rope on said main structure, said rope being led about said sheave in such manner that said rope remains taut regardless of the position of said extension relative to said main structure.

13. Apparatus for launching aircraft comprising a main structure having a runway, an extension on said structure movable between a stowed and an exposed position in which said extension projects beyond said structure, a runway on said extension, a cylinder and piston on said main structure, means for driving the piston, a cross-head connected to said piston, means for retarding the movement of the piston, and means connected to said piston and opposite ends of a trolley for accelerating and retarding said trolley by means of said piston.

14. Apparatus for launching aircraft comprising a main structure having a runway, a pair of extensions mounted one in each end of said structure and movable to project beyond said ends, a runway on each extension, a trolley movable along said runways, a prime mover for moving said trolley, and ropes connected to said prime mover and to opposite ends of said trolley, one of said ropes serving to cause acceleration of said trolley upon operation of said prime mover, the other rope acting to retard said trolley.

15. Apparatus for launching aircraft comprising a main structure having a runway, a pair of extensions mounted one in each end of said structure and movable to project beyond said ends, a runway on each extension, a trolley movable along said runways, a prime mover for moving said trolley, a rope connected to said prime mover and to one end of said trolley, a second rope connected to said prime mover and to the other end of said trolley, and sheaves guiding said ropes, each rope being led around a sheave at the end of said main structure and about sheaves at opposite ends of one of said extensions.

16. Apparatus for launching aircraft comprising a main structure having a runway formed of spaced rails at the top of the structure and facing each other, an extension mounted on said structure for movement lengthwise thereof and having at its top spaced rails lying between the rails on said structure, a trolley having duplicate sets of wheels one set moving on the first runway, the other on the second, means for moving said extension from a position substantially within said structure to another position in which it projects beyond the latter, and means for moving said trolley along said runways.

17. Apparatus for launching aircraft comprising a main structure mounted on a vertical pivot, an extension on said structure and movable to project beyond the latter, a runway carried in part by said structure and in part by said extension, a prime mover on said structure, and a connection between said prime mover and said trolley, said extension being freely movable relative to said structure without affecting the operation of said connection.

In testimony whereof I affix my signature.

WILLIAM ARCHIBALD DAVIDSON FORBES.